United States Patent
Hansen et al.

(10) Patent No.: US 6,183,038 B1
(45) Date of Patent: Feb. 6, 2001

(54) DOOR TRIM ASSEMBLY AND METHOD OF MAKING SAME

(75) Inventors: Eric Ransford Hansen, Lake Orion; Arthur Carl Stein, Grosse Ile; Brian Hale Staser, Troy; Pamela Lane Codd, Utica, all of MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/268,198

(22) Filed: Mar. 11, 1999

(51) Int. Cl.⁷ .................................................. B60J 5/00
(52) U.S. Cl. ................................. 296/146.7; 296/146.6; 296/39.1; 296/37.13; 49/502
(58) Field of Search .................. 296/146.7, 39.1, 296/146.6, 37.13, 153; 49/502

(56) References Cited

U.S. PATENT DOCUMENTS

| | | | |
|---|---|---|---|
| 3,808,743 | * 5/1974 | Renner et al. | 296/153 |
| 3,964,208 | * 6/1976 | Renner et al. | 296/146.6 |
| 3,989,275 | * 11/1976 | Finch et al. | 296/146.7 |
| 4,411,944 | * 10/1983 | Moore | 296/39.1 |
| 4,562,025 | 12/1985 | Gray . | |
| 4,766,025 | 8/1988 | Sanok et al. . | |
| 4,783,114 | * 11/1988 | Welch | 296/153 |
| 4,806,094 | 2/1989 | Rhodes, Jr. et al. . | |
| 5,004,292 | * 4/1991 | Horne | 296/153 |
| 5,040,335 | * 8/1991 | Grimes | 296/146.7 |
| 5,102,163 | 4/1992 | Ishikawa . | |
| 5,143,667 | 9/1992 | Matsuura et al. . | |
| 5,224,299 | * 7/1993 | Abe | 296/39.1 |
| 5,271,885 | 12/1993 | Denker et al. . | |
| 5,306,068 | * 4/1994 | Nakae et al. | 296/146.6 |
| 5,328,651 | 7/1994 | Gallagher et al. . | |
| 5,387,390 | 2/1995 | Kornylo . | |
| 5,462,482 | * 10/1995 | Grimes | 296/146.7 |
| 5,482,344 | * 1/1996 | Walker et al. | 296/146.7 |
| 5,535,571 | * 7/1996 | Niclols | 296/37.13 |
| 5,580,119 | * 12/1996 | Uchida et al. | 296/146.6 |
| 5,580,501 | 12/1996 | Gallagher et al. . | |
| 5,595,415 | * 1/1997 | Beaulat | 296/39.1 |
| 5,603,548 | * 2/1997 | Gandhi et al. | 296/146.7 |
| 5,618,477 | 4/1997 | Suzuki . | |
| 5,695,865 | 12/1997 | Shimizu . | |
| 5,924,760 | * 7/1999 | Krajewski et al. | 296/146.6 |

* cited by examiner

*Primary Examiner*—Joseph D. Pape
*Assistant Examiner*—Kiran Patel
(74) *Attorney, Agent, or Firm*—Patrick M. Griffin

(57) ABSTRACT

A door trim assembly and method for making same for attachment to an inner panel of an automotive vehicle includes a plurality of components and a single carrier formed from a plastic material for attachment to the inner panel of the automotive vehicle and incorporating the plurality of components into the plastic material and a door trim substrate attached to the carrier.

12 Claims, 2 Drawing Sheets

DOOR TRIM ASSEMBLY AND METHOD OF MAKING SAME

TECHNICAL FIELD

The present invention relates generally to door trims for vehicles and, more particularly, to a door trim assembly and method of making the same for an automotive vehicle.

BACKGROUND OF THE INVENTION

It is known to provide a door trim assembly for a vehicle such as an automotive vehicle to present an aesthetically pleasing appearance in an occupant compartment of the automotive vehicle. The door trim assembly includes a plurality of separate components with each component having a specific function. The components typically include a door trim substrate, sound absorber, water barrier, insert, armrest, and map pocket closeout and side impact blocks. The components are assembled together and attached to the door trim substrate by several different conventional processes including adhesives, heat staking, and sonic welding. The door trim assembly is then mounted to an inner door panel of a door for the automotive vehicle by suitable means such as fasteners.

Although the above door trim assembly has worked well, it is desirable to reduce the number of components and cost associated with the purchase and assembly of the door trim assembly. It is also desirable to provide a door trim assembly with reduced mass and tooling per vehicle. Therefore, there is a need in the art to provide an improved door trim assembly and method of making same which includes a single component with multi-functions for attachment to an inner panel of a door for an automotive vehicle.

SUMMARY OF THE INVENTION

It is, therefore, one object of the present invention to provide a new door trim assembly and method of making same for an automotive vehicle.

It is another object of the present invention to provide a door trim assembly that incorporates many components into a single component for attachment to an inner panel of a door for an automotive vehicle.

It is yet another object of the present invention to provide a door trim assembly that is multi-functional for attachment to an inner panel of a door for an automotive vehicle.

It is still another object of the present invention to provide a door trim assembly which has fewer components and cost.

It is a further object of the present invention to provide a new method of making a door trim assembly.

To achieve the foregoing objects, the present invention is a door trim assembly for attachment to an inner panel of an automotive vehicle. The door trim assembly includes at least one component and a single carrier formed from a plastic material for attachment to the inner panel of the automotive vehicle and incorporating the at least one component into the plastic material and a door trim substrate attached to the carrier.

Also, the present invention is a method of making a door trim assembly for attachment to an inner panel of an automotive vehicle. The method includes the steps of placing at least one component into a cavity of a mold. The method includes the steps of filling the cavity with a plastic material. The method includes the step of introducing steam into the mold to expand the plastic material and incorporate the at least one component into the plastic material to form a single carrier and removing the carrier from the mold. The method includes the step of attaching a door trim substrate to the carrier.

One advantage of the present invention is that an improved door trim assembly and method of making same is provided for an automotive vehicle. Another advantage of the present invention is that the door trim assembly integrates a plurality of components into a single component. Yet another advantage of the present invention is that the door trim assembly reduces the number of separate components, cost and tooling for the same. Still another advantage of the present invention is that the door trim assembly reduces mass and minimizes wind noise. A further advantage of the present invention is that the door trim assembly provides a barrier, reduces noise and improves vehicle acoustical characteristics.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
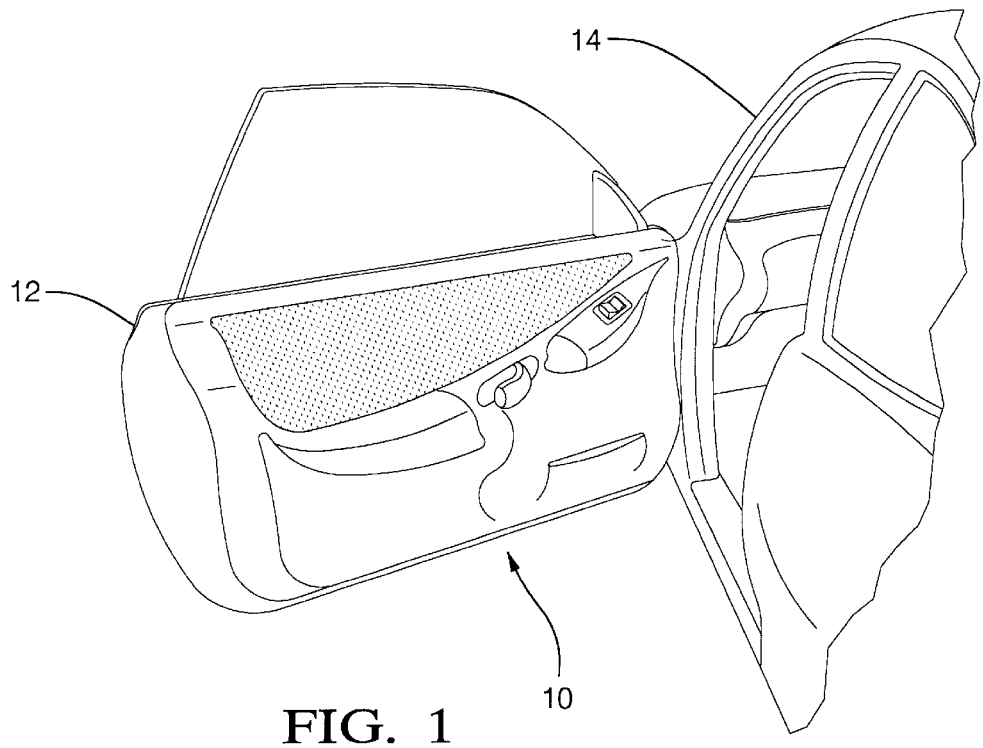
FIG. 1 is a perspective view of a door trim assembly, according to the present invention, illustrated in operational relationship with an automotive vehicle.
Figure 2:
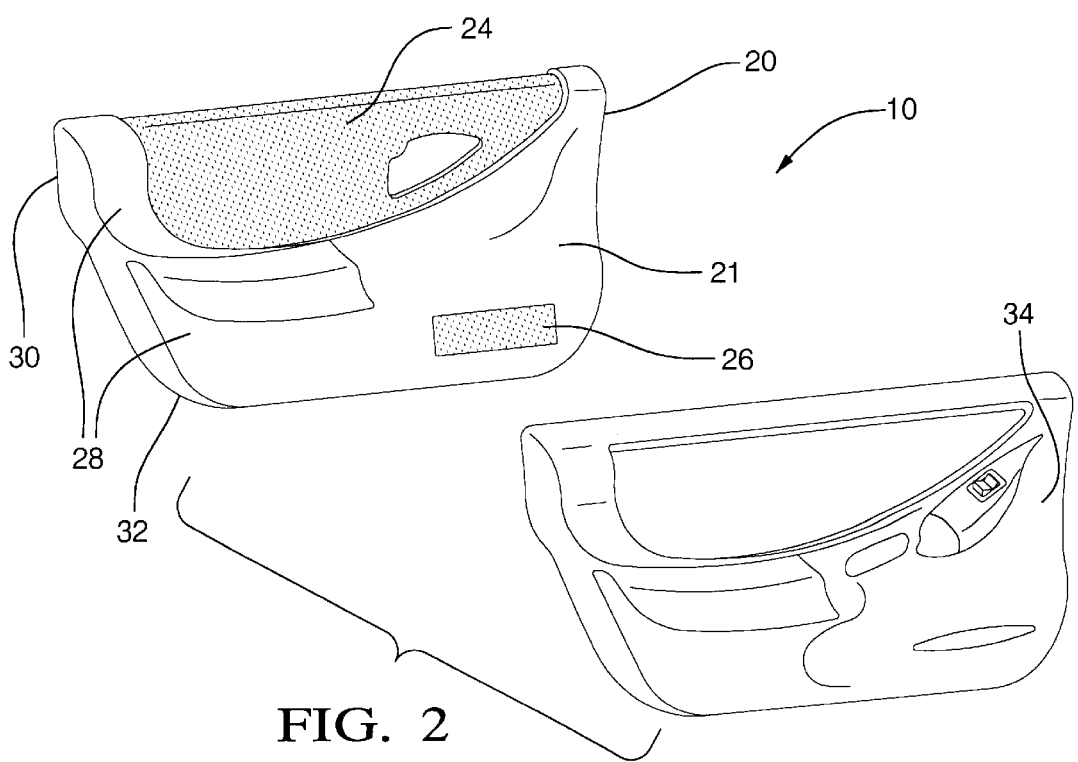
FIG. 2 is an exploded view of the door trim assembly of FIG. 1.
Figures 3, 4:
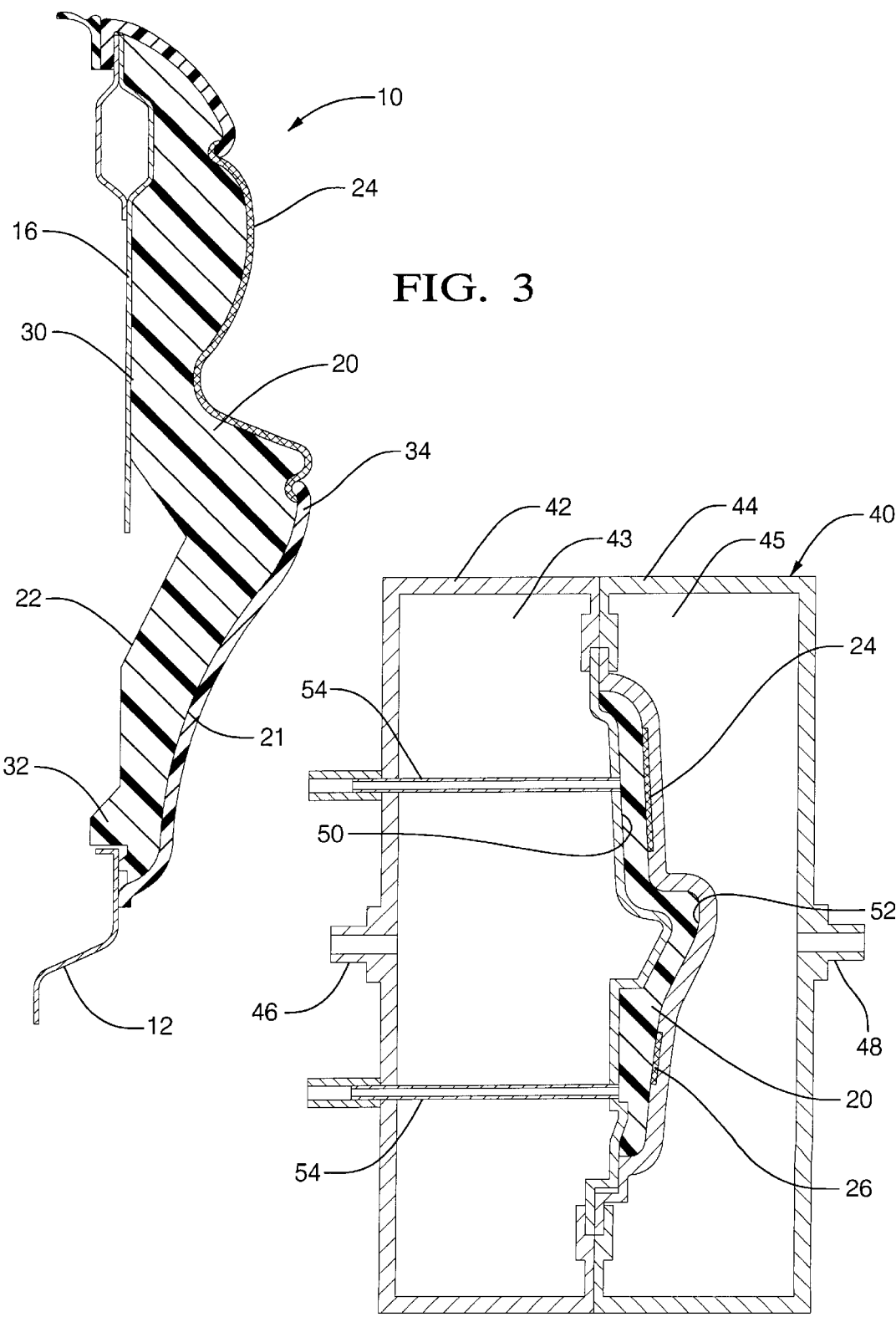
FIG. 3 is a fragmentary side view of the door trim assembly of FIG. 1.
FIG. 4 is a fragmentary side view of a mold used in a method, according to the present invention, of making the door trim assembly of FIG. 1.

Referring to the drawings and in particular FIGS. 1 and 2, one embodiment of a door trim assembly 10, according to the present invention, is shown mounted to a door 12 of a vehicle 14 such as an automotive vehicle. It should be appreciated that, in this example, the door trim assembly 10 is mounted to an inner panel 16 of the door 12 as illustrated in FIG. 3. It should also be appreciated that the door trim assembly 10 may be an assembly mounted to other panels of the vehicle 14.

Referring to FIGS. 1 through 3, the door trim assembly 10 includes a carrier 20 extending longitudinally and vertically and having a generally rectangular shape. The carrier 20 is made of a plastic material such as polypropylene. Preferably, the carrier 20 is made of expanded polypropylene. The carrier 20 is formed by a method, according to the present invention, to be described. The carrier 20 has an inner side 21 and an outer side 22. The outer side 22 is attached to the inner panel 16 of the door 12 by suitable means such as fasteners (not shown).

The door trim assembly 10 also includes a plurality of components incorporated or integrated into the carrier 20. The components may include an insert 24. The insert 24 extends longitudinally and vertically. The insert 24 is made of a fabric or cloth, vinyl, TPO (Thermal Plastic Polyolifin), leather or carpet material. The insert 24 is bonded to the inner side 21 of the carrier 20 by the plastic material of the carrier 20. It should be appreciated that the insert 24 is a separate piece or component.

The components may also include a map pocket closeout 26. The map pocket closeout 26 is generally rectangular in shape. The map pocket closeout 26 is made of a fabric or cloth, vinyl, TPO (Thermal Plastic Polyolifin), leather or carpet material. The map pocket closeout 26 is bonded to the inner side 21 of the carrier 20 by the plastic material of the carrier 20. It should be appreciated that the map pocket closeout is a separate piece of component.

The components may further include at least one, preferably a plurality of side impact blocks 28. The side impact blocks 28 are generally rectangular in shape. The side impact blocks 28 are made of a plastic material such as polypropylene. The side impact blocks 28 are molded as part of the inner side 21 of the carrier 20 by the plastic material of the carrier 20. It should be appreciated that the side impact blocks 28 and carrier 20 are integral, unitary and formed as one-piece.

The components may also include a sound absorber 30. The sound absorber 30 is generally rectangular in shape. The sound absorber 30 is made of a plastic material such as polypropylene. The sound absorber 30 is molded as part of the outer side 22 of the carrier 20 by the plastic material of the carrier 20. It should be appreciated that the sound absorber 30 and carrier 20 are integral, unitary and formed as one-piece.

The components may include a water barrier 32. The water barrier 32 is generally rectangular in shape and overlaps a portion of the inner panel 16 of the door 12 in a flow direction. The water barrier 32 is made of a plastic material such as polypropylene. The water barrier 32 is molded as part of the outer side 22 of the carrier 20 by the plastic material of the carrier 20. It should be appreciated that the water barrier 32 and carrier 20 are integral, unitary and formed as one-piece.

The door trim assembly 10 includes a finished door trim substrate 34. The door trim substrate 34 extends longitudinally and vertically and is generally rectangular in shape. The door trim substrate 34 conforms to the shape of the carrier 20 such that the carrier 20 is disposed within the door trim substrate 34. The door trim substrate 34 is made of a relatively rigid material such as plastic, plant fiber, composite or the like. The door trim substrate 34 is attached to the carrier 20 by suitable means such as an adhesive, fasteners, heat staking, sonic welding or the like. It should be appreciated that the door trim substrate 34 presents a class A surface as is known in the art. It should also be appreciated that the door trim substrate 34 is conventional and known in the art.

Referring to FIG. 4, a method, according to the present invention, of making the door trim assembly 10 is disclosed. As illustrated, a mold, generally indicated at 40, includes a first half mold 42 and a second half mold 44. The first and second half molds 42 and 44 are generally hollow to form a chamber 43 and 45, respectively. The first and second half molds 42 and 44 have an inlet 46 and 48, respectively, for allowing a fluid such as steam to enter the chamber 43 and 45 of the first and second half molds 42 and 44. The first and second half molds 42 and 44 each include a mold cavity 50 and 52, respectively, for forming the carrier 20. The first half mold 42 includes at least one, preferably a plurality of fill inlets 54 extending into the mold cavity 50 and 52 to allow fill guns (not shown) to fill the mold cavity 50 and 52 with the plastic material for the carrier 20. It should be appreciated that the mold 40 is conventional and known in the art.

The method, according to the present invention, includes the steps of placing at least one, preferably a plurality of the components into the cavity 50 and 52 of the mold 40. In particular, the insert 24 and map pocket closeout 26 are placed into the cavity 50 and 52 of the mold 40. The cavity 50 and 52 is shaped to mold the components for the side impact blocks 28, sound absorber 30 and water barrier 32, which are molded into the carrier 20. The method includes the steps of filling the cavity 50 and 52 with the plastic material for the carrier 20. In the preferred embodiment, the plastic material is expanded polypropylene. As such, the cavity 50 and 52 is filled with beads of expanded polypropylene, which enter the mold 40 via the fill inlets 54. Next, the method includes the step of introducing steam into the mold 40 via the inlets 46 and 48 to expand the plastic material and incorporate the components into the plastic material to form a single carrier 20. In particular, steam enters the chambers 43 and 45 of the first and second half molds 42 and 44, respectively, through the inlets 46 and 48. It should be appreciated that the steam enters the core side only on shoot behind parts to expand the beads of polypropylene.

The method may include the step of spraying a coolant such as water through nozzles (not shown) onto the backside of the cavity 50 and 52 of the mold 40 to cool the carrier 20. Once the carrier 20 is cooled, the method includes the step of opening the mold 40 and removing the carrier 20 from the mold 40. Finally, the method includes the step of attaching the door trim substrate 34 to the carrier 20 by suitable means such as fasteners, adhesives, heat staking, sonic welding or the like.

Accordingly, the door trim assembly 10 incorporates an insert 24 and map pocket closeout 26 as separate parts and molds the side impact blocks 28, sound absorber 30 and water barrier 32 into a single component or carrier 20. The door trim assembly 10 reduces mass, vehicle piece cost, and tooling per vehicle. The door trim assembly 10 is recyclable. The door trim assembly 10 minimizes wind noise and reduces air leakage around certain components. The door trim assembly 10 provides a thermal barrier and effective moisture/dust/carbon monoxide/sound barrier. The door trim assembly 10 reduces squeaks and rattles and improves vehicle acoustical characteristics.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door trim assembly for attachment to an inner panel for an automotive vehicle comprising:

at least one component;

a single carrier formed from a plastic material for attachment to the inner panel of the automotive vehicle and incorporating the at least one component into the plastic material; and a door trim substrate attached to said carrier, said carrier being disposed within said door trim substrate between said door trim substrate and the inner panel of the door.

2. A door trim assembly as set forth in claim 1 wherein said plastic material is expanded polypropylene.

3. A door trim assembly as set forth in claim 1 wherein said at least one component is from a group comprising an insert, side impact blocks, map pocket closeout, sound absorber and water barrier.

4. A door trim assembly as set forth in claim 1 wherein said carrier has an inner side and an outer side, said at least one component being located on said inner side.

5. A door trim assembly as set forth in claim 1 wherein said at least one component is formed from a material from a group comprising cloth, carpet, vinyl, tpo and plastic.

6. A door trim assembly as set forth in claim 1 wherein said door trim substrate is made of at least one material from a group comprising plastic, plant fiber and a composite.

7. A door trim assembly as set forth in claim 1 wherein said door trim substrate is a finished part.

8. A door trim assembly as set forth in claim 1 wherein said at least one component is a separate part.

9. A door trim assembly as set forth in claim 1 wherein said at least one component is molded into said carrier.

10. A door trim assembly for attachment to an inner panel of a door on an automotive vehicle comprising:

a plurality of components;

a carrier made of expanded polypropylene and incorporating said components and adapted to mount on the inner panel of the door; and a plastic door trim substrate attached to said carrier, said door trim substrate conforming to a shape of said carrier and said carrier being disposed within said door trim substrate between said door trim substrate and the inner panel of the door.

11. A door trim assembly as set forth in claim 10 wherein said plurality of components are at least two from a group comprising an insert, side impact blocks, maps pocket closeout, sound absorber and water barrier.

12. A door trim assembly as set forth in claim 10 wherein two of said components are seperate parts and the remainder of said components are molded into said carrier.

* * * * *